(12) United States Patent
Choi et al.

(10) Patent No.: US 12,292,279 B2
(45) Date of Patent: May 6, 2025

(54) MOVEMENT INTERVAL MEASUREMENT APPARATUS FOR CHECKING OPERATING STATUS OF VEHICLE POWER TRANSMISSION APPARATUS UNAFFECTED BY TEMPERATURE

(71) Applicant: SHILLA INDUSTRIAL CO., LTD., Gyeongsan-si (KR)

(72) Inventors: Byoung Sun Choi, Daegu (KR); Ik Hyun Kwon, Daegu (KR)

(73) Assignee: SHILLA INDUSTRIAL CO., LTD., Gyeongsan-si (KR)

( * ) Notice: Subject to any disclaimer, the term of this patent is extended or adjusted under 35 U.S.C. 154(b) by 290 days.

(21) Appl. No.: 18/010,374

(22) PCT Filed: Sep. 22, 2020

(86) PCT No.: PCT/KR2020/012754
§ 371 (c)(1),
(2) Date: Dec. 14, 2022

(87) PCT Pub. No.: WO2022/045432
PCT Pub. Date: Mar. 3, 2022

(65) Prior Publication Data
US 2023/0266113 A1 Aug. 24, 2023

(30) Foreign Application Priority Data
Aug. 31, 2020 (KR) .................. 10-2020-0110107

(51) Int. Cl.
*G01B 7/02* (2006.01)
*G01B 7/14* (2006.01)
*G01M 13/022* (2019.01)

(52) U.S. Cl.
CPC ............ *G01B 7/023* (2013.01); *G01B 7/146* (2013.01); *G01M 13/022* (2013.01)

(58) Field of Classification Search
CPC ...................................... G01B 7/023
(Continued)

(56) References Cited

U.S. PATENT DOCUMENTS

| 2006/0171091 A1 | 8/2006 | Seale et al. | |
| 2011/0304323 A1* | 12/2011 | Okada | G01B 7/003 |
| | | | 324/207.15 |

FOREIGN PATENT DOCUMENTS

| JP | 2009254066 | 10/2009 |
| KR | 101697975 | 1/2017 |
| KR | 102125333 | 6/2020 |

OTHER PUBLICATIONS

International Search Report—PCT/KR2020/012754 dated May 18, 2021.

* cited by examiner

*Primary Examiner* — Walter L Lindsay, Jr.
*Assistant Examiner* — Philip T Fadul
(74) *Attorney, Agent, or Firm* — CANTOR COLBURN LLP

(57) ABSTRACT

Provided is a movement distance measurement apparatus for confirming the operating state of a power transmission device for automobiles, which has removed the effect of temperature, and the movement distance measurement apparatus for confirming the operating state of a power transmission device for automobiles, which has removed the effect of temperature, is configured to measure the movement distance T of the detection target object 20 using a resonance circuit including the sensing coil by using changes in the resonance frequency of the resonance circuit and changes in the output voltage of the resonance circuit according to changes in the distance between the detection target object 20 and the sensing coil, and to be provided with a diode voltage detection unit that separately detects diode (Continued)

voltage included in the output value of the resonance circuit not to be affected by temperature change by removing the diode voltage.

6 Claims, 9 Drawing Sheets

(58) Field of Classification Search
 USPC .................................................... 73/115.02
 See application file for complete search history.

MOVEMENT INTERVAL MEASUREMENT APPARATUS FOR CHECKING OPERATING STATUS OF VEHICLE POWER TRANSMISSION APPARATUS UNAFFECTED BY TEMPERATURE

TECHNICAL FIELD

The present invention relates to a movement distance measurement apparatus for confirming the operating state of a power transmission device for automobiles controlled by an actuator, and more specifically, to a movement distance measurement apparatus with the effect of temperature removed therefrom, which confirms the operating state of a power transmission device by measuring, using the tuning characteristic of a resonance circuit, changes in the inductance of a sensing coil corresponding to changes in the distance between a detection target object, moving according to the operation of an actuator in the power transmission device of a vehicle, and the sensing coil.

BACKGROUND ART

Generally, an actuator has an operating principle of moving to a predetermined position by a driving source that moves an internal operator, and returning to the original position when the driving source is removed.

In addition, as the driving source of the actuator may be electromagnetic force of a solenoid coil, electromagnetic force of a motor coil, or pressure by hydraulic pressure, it is not limited to any one as far as it is a driving source capable of moving the internal operator.

For example, a solenoid actuator has an operating principle of generating an electromagnetic force for moving an operating metal core to apply an operating force to a counterpart (clutch or the like) when a current is applied to the solenoid coil, and returning the operating metal core to its original position when the power of the solenoid coil is turned off.

An actuator for controlling a power transmission device for automobiles (e.g., solenoid actuator or the like) is mainly used as an actuator for regulating power of an automobile and applied to, for example, an electronic differential lock (EDL) for automobiles, an electric disconnect differential (EDD), and the like.

As shown in FIG. 1, a power transmission device 1 for automobiles controlled by the actuator includes a drive shaft 40 including an engaging structure, a movable propulsion shaft 50 engaged with the drive shaft to transfer power, a detection target object 20 of a metal material connected to the propulsion shaft to move together, an internal operator 10 for transferring an operating force to the propulsion shaft, and an actuator 60 including an actuator driving source 30 to control the power transmission device for automobiles.

Although a mechanical switch using spring elasticity may be used as a general means for grasping whether the power transmission device for automobiles actually operates, the mechanical switch may bring loss of operating force of the actuator as additional power is required to operate the switch, and when abrasion of a switch contact part occurs due to frequent operation or a problem occurs due to damage or sticking of internal parts, there is no way of systematically confirming the problems.

Although a hall sensor using a magnet may be used as another means, it may generate a malfunction of the device as the magnet component may adsorb iron particles in the power transmission device. In addition, since the hall sensor is affected by the electromagnetic field of the solenoid or motor coil, a considerably high level of processing and assembly tolerance are required to secure a separate space for avoiding the effect and to maintain a gap with a detection target object, and therefore, there is a problem in that the size of the device is unnecessarily large, or high cost is required.

DISCLOSURE OF INVENTION

Technical Problem

Therefore, the present invention has been made in view of the above problems, and it is an object of the present invention to provide a movement distance measurement apparatus for confirming the operating state of a power transmission device for automobiles.

Another object of the present invention is to provide a movement distance measurement apparatus for confirming the operating state of a power transmission device for automobiles by measuring moving distance of a detection target object moving together with an internal operator when an actuator operates.

Still another object of the present invention is to provide a movement distance measurement apparatus for confirming the operating state of a power transmission device for automobiles, which minimizes or removes the effect of temperature.

Technical Solution

To accomplish the above objects, according to one aspect of the present invention, in a power transmission device for automobile provided with a drive shaft including an engaging structure, a movable propulsion shaft engaged with the drive shaft to transfer power, a detection target object of a metal material connected to the propulsion shaft to move together, an internal operator for transferring an operating force to the propulsion shaft, and an actuator including an actuator driving source to control the power transmission device for automobiles, a movement distance measurement apparatus for confirming an operating state of the power transmission device for automobiles when the detection target object operates comprises: a square wave generator for generating a square wave of a specific frequency; a low-pass filter for converting a square wave generated by the square wave generator into a sine wave or removing noise components excluding a reference frequency component of the square wave; a tuned amplifier configured to amplify a signal passing through the low-pass filter, include a resonance circuit including a sensing coil, and provide an output signal including a resonance frequency, which changes in response to changes in the distance between the detection target object and the sensing coil, and the output voltage of the resonance circuit that changes; a DC restorer for removing a bias voltage from the output signal of the tuned amplifier to output only signals of AC component; a maximum value detection unit for detecting a maximum voltage value from the output signal of the DC restorer; a diode voltage detection unit for detecting as many second diode voltage values as the number of diodes used in the DC restorer and the maximum value detection unit in order to remove a first diode voltage value included in the maximum voltage value output from the maximum value detection unit; an AD converter for converting the maximum voltage value of the maximum value detection unit and the second diode voltage value of the diode voltage detection unit into digital signals and outputs the converted signals; and a control unit for removing the effect of diode voltage according to temperature change by removing the first diode voltage value included in the digital-converted maximum voltage value using the digital-converted second diode voltage value, and outputting a moving distance value of the detection target object by comparing the maximum voltage value, from which the first diode voltage value is removed, with previously stored comparison data.

The DC restorer may be configured of a capacitor and a diode connected in series with each other, and configured as a clamping circuit for outputting the second diode voltage value.

The diode voltage detection unit may be configured using a resistor and at least one diode sequentially connected in series between the power supply voltage VCC and the ground, and configured as a circuit for outputting the second diode voltage value as an output value.

The control unit may remove the effect of the diode voltage according to the temperature change by adding the second diode voltage value to the maximum voltage value digitally converted through the AD converter.

When an input signal source having a specific frequency is input into the resonance circuit, the moving distance of the detection target object may be measured by using a principle that the output voltage of the tuned amplifier decreases as the distance between the sensing coil and the detection target object increases when the sensing coil and the detection target object are closest to each other, or using the principle that the output voltage of the tuned amplifier decreases as the distance between the sensing coil and the detection target object decreases when the sensing coil and the detection target object are farthest from each other.

Advantageous Effects

According to the present invention, as movement of a detection target object of a metal material connected to a propulsion shaft of a power transmission device for automobiles to move together is measured using changes in the inductance of a sensing coil L1 corresponding to changes in the distance between the sensing coil and the detection target object, there is an advantage in that it is possible to know the controlled operating state of the power transmission device for automobiles by the operation of the detection target object. In addition, it is possible to implement a movement distance measurement apparatus not affected by temperature change.

BEST MODE FOR CARRYING OUT THE INVENTION

Hereinafter, a preferred embodiment of the present invention will be described in detail with reference to the accompanying drawings without any intention other than to provide a thorough understanding of the present invention to those skilled in the art.

Figure 1:
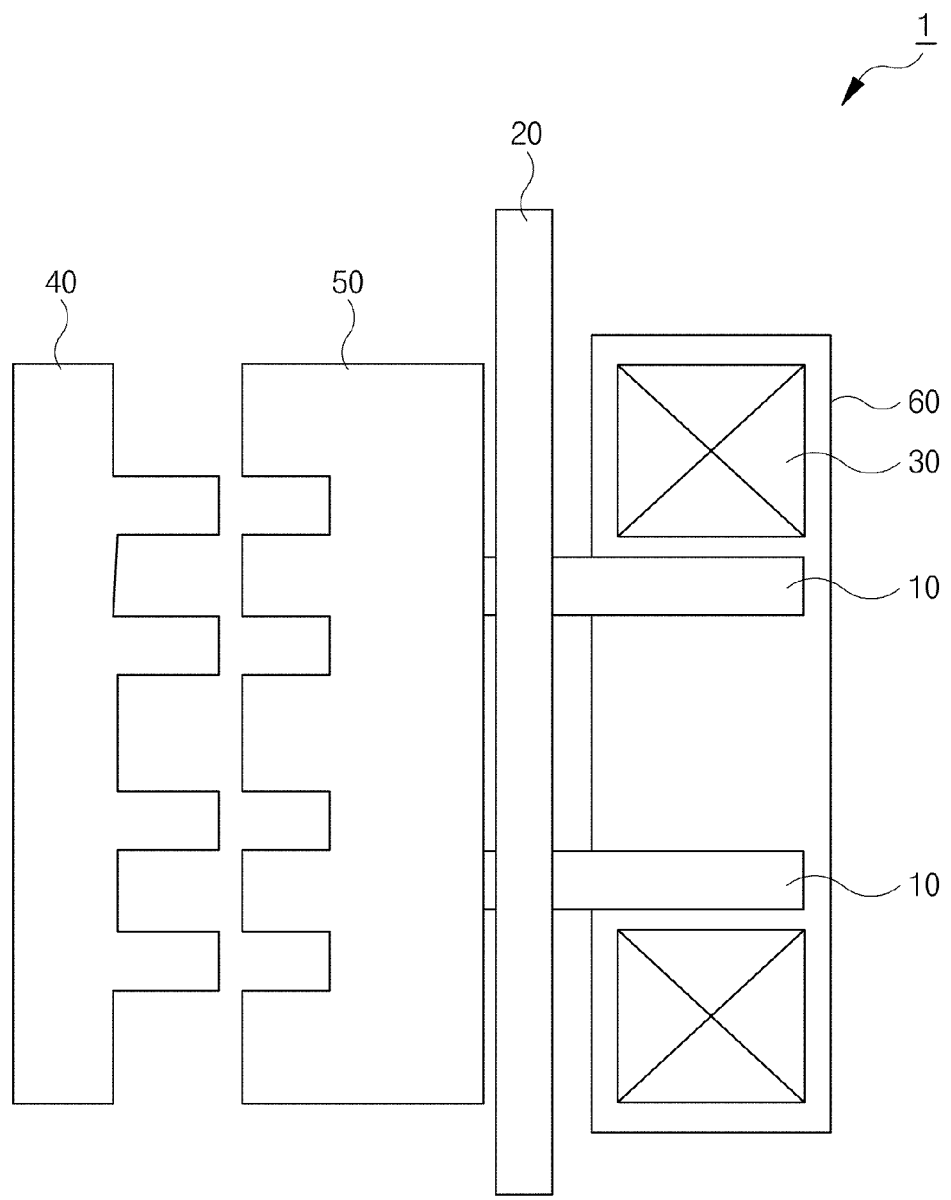
FIG. 1 is a schematic structural view showing a general power transmission device for automobiles.
Figure 2:
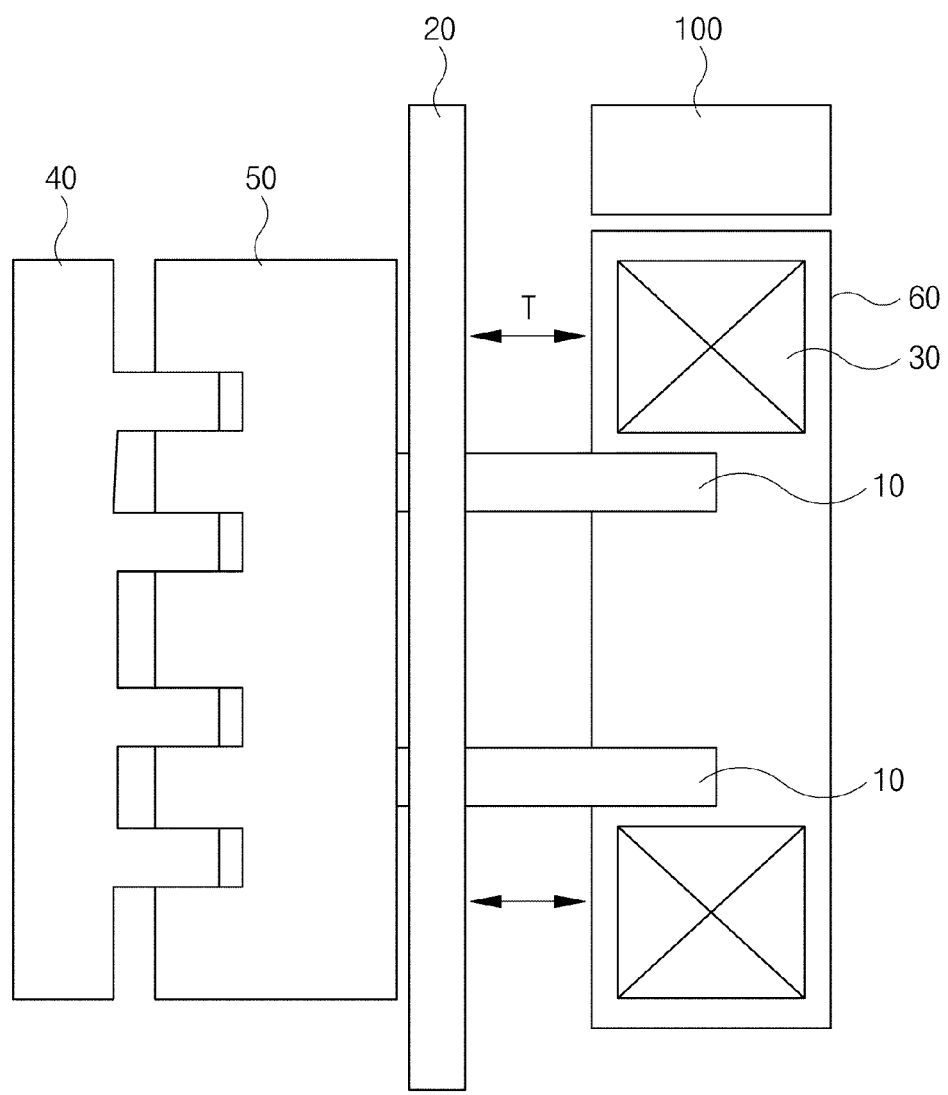
FIG. 2 is a schematic structural view showing a power transmission device for automobiles, which is equipped with a movement distance measurement apparatus for confirming an operating state according to an embodiment of the present invention.

FIG. 2 is a schematic structural diagram showing a movement distance measurement apparatus for confirming the operating state of a power transmission device for automobiles controlled by an actuator according to an embodiment of the present invention.

As shown in FIG. 2, the movement distance measurement apparatus 100 for confirming the operating state of the power transmission device 1 for automobiles under the control of the actuator 60 according to an embodiment of the present invention is provided in the actuator 60. The power transmission device 1 for automobiles includes a drive shaft 40 including an engaging structure, a movable propulsion shaft 50 engaged with the drive shaft to transfer power, a detection target object 20 of a metal material moving together with the propulsion shaft, an internal operator 10 for transferring an operating force to the propulsion shaft, and an actuator 60 including an actuator driving source 30 to control the power transmission device for automobiles.

The movement distance measurement apparatus 100 for confirming the operating state of a power transmission device for automobiles according to an embodiment of the present invention measures the moving distance T of the detection target object 20 using a resonance circuit including the sensing coil by using changes in the resonance frequency of the resonance circuit and changes in the output voltage of the resonance circuit according to changes in the distance between the detection target object 20 and the sensing coil. That is, the movement distance measurement apparatus 100 senses the operating state of the entire system, such as EDL or EDD, by measuring the distance between the detection target object 20 and the sensing coil according to movement of the detection target object 20 connected to the internal operator 10 when the actuator for a power transmission device for automobiles operates.

Accordingly, the movement distance measurement apparatus 100 for confirming the operating state of a power transmission device for automobiles according to an embodiment of the present invention should be provided at a position where the sensing coil constituting the resonance circuit can be affected by the movement of the detection target object 20, and disposed to be adjacent to the actuator for the power transmission device for automobiles.

Figure 3:
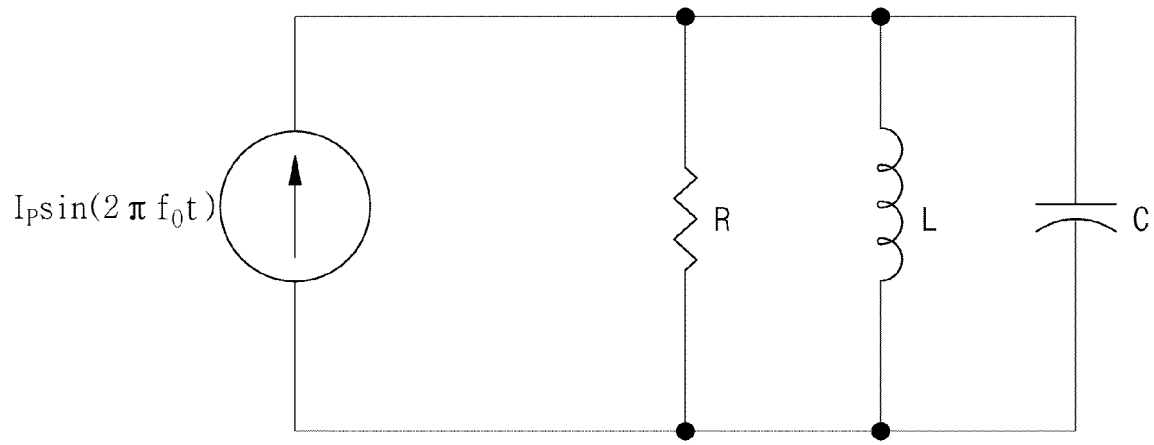
FIG. 3 is a circuit diagram for explaining the principle of the movement distance measurement apparatus of FIG. 2.
Figure 4:
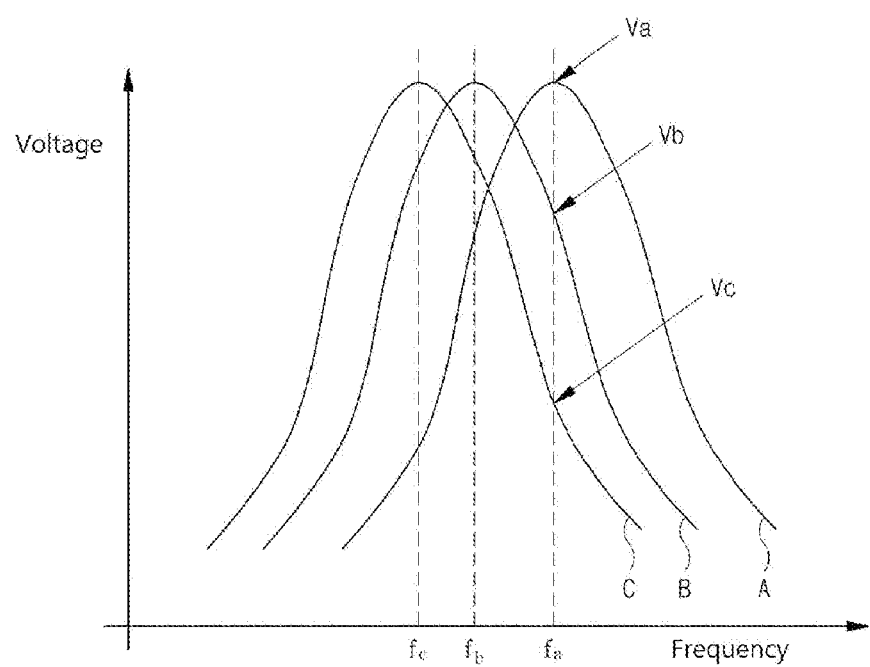
FIGS. 4 and 5 are graphs for explaining the principle of the movement distance measurement apparatus of FIG. 2.
Figure 5:
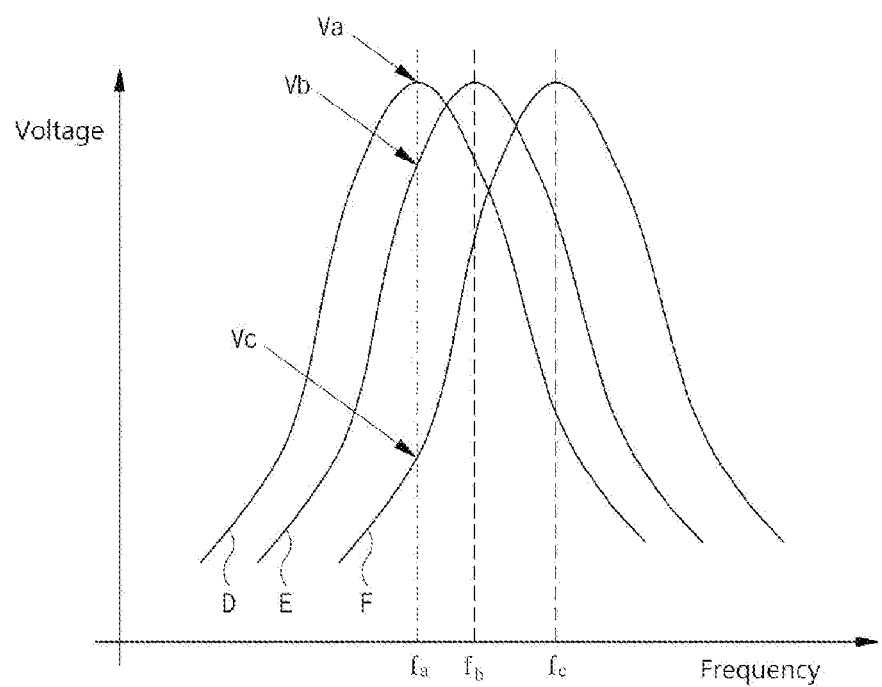

The principle of measuring the moving distance of the detection target object is briefly described below with reference to FIGS. 3 to 5. FIG. 3 is a view showing a resonance circuit for explaining the measurement principle of the movement distance measurement apparatus 100, and FIGS. 4 and 5 are graphs for explaining the measurement principle of the movement distance measurement apparatus 100.

As shown in FIG. 3, the resonance circuit is provided with an input signal source $I_p \sin(2\pi f_0 t)$, and has a structure of connecting a resistor R, a sensing coil L, and a capacitor C in parallel.

When the frequency $f_0$ of the input signal of the input signal source $I_p \sin(2\pi f_0 t)$ matches the resonance frequency $f_r$, the maximum voltage appears at both ends of the resonance circuit. Here, the resonance frequency $f_r$ and the quality factor Q are expressed as follows.

$$f_r = \frac{1}{2\pi\sqrt{LC}}$$

$$Q_r = R\sqrt{\frac{C}{L}}$$

FIG. 4 is a graph showing changes in the resonance characteristic based on a situation in which the sensing coil L and the detection target object 20 are closest to each other in the resonance circuit of FIG. 3.

As shown in FIG. 4, when the frequency of the input signal source $I_p \sin(2\pi f_0 t)$ is applied to satisfy $f_o = f_a$ in the resonance circuit having the resonance characteristic as shown in FIG. 3, the resonance characteristic graph appears as shown in the rightmost graph (A), and the magnitude of the output voltage of the resonance circuit becomes Va. When the distance between the sensing coil L and the detection target object 20 increases in this state, inductance of the sensing coil L increases, and the resonance characteristic changes as shown in the resonance circuit characteristic graph (B) in the middle. At this point, the magnitude of the voltage of the resonance circuit becomes Vb.

When the distance between the sensing coil L and the detection target object 20 further increases, the inductance of the sensing coil L further and the resonance increases, characteristic changes as shown in the resonance circuit characteristic graph (C) on the left, and at this point, the magnitude of the output voltage of the resonance circuit becomes Vc. That is, as the distance between the sensing coil L and the detection target object 20 increases, the resonance frequency of the resonance circuit decreases, and the output voltage of the resonance circuit decreases. The distance between the sensing coil L and the detection target object 20 can be measured using this principle.

FIG. 5 is a graph showing changes in the resonance characteristic based on a situation in which the sensing coil L and the detection target object 20 are farthest from each other in the resonance circuit of FIG. 3.

As shown in FIG. 5, when the frequency of the input signal source $I_p \sin(2\pi f_0 t)$ is applied to satisfy $f_o = f_a$ in the resonance circuit having the resonance characteristic as shown in FIG. 3, the resonance characteristic graph appears as shown in the leftmost graph (D), and the magnitude of the voltage of the resonance circuit becomes Va. When the distance between the sensing coil L and the detection target object 20 decreases, inductance of the sensing coil L decreases, and the resonance characteristic changes as shown in the resonance circuit characteristic graph (E) in the middle. At this point, the output voltage of the resonance circuit becomes Vb. Thereafter, when the distance between the sensing coil L and the detection target object 20 further decreases, the inductance of the sensing coil T further decreases, and the resonance characteristic changes as shown in the resonance circuit characteristic graph (F) on the right. At this time, the output voltage of the resonance circuit becomes Vc.

That is, as the distance between the sensing coil L and the detection target object 20 decreases, the frequency of the resonance circuit increases, and the output voltage of the resonance circuit decreases. Using this principle, the distance between the sensing coil L and the detection target object 20 can be measured.

Accordingly, as shown in FIG. 4, the distance between the sensing coil L and the detection target object 20 may be measured using the left characteristic of the characteristic graph of the resonance circuit when the distance between the sensing coil L and the detection target object 20 is the closest, and using the right characteristic of the characteristic graph of the resonance circuit when the distance between the sensing coil L and the detection target object 20 is the farthest.

The above circuit may be implemented using a tuned amplifier.

Figure 6:
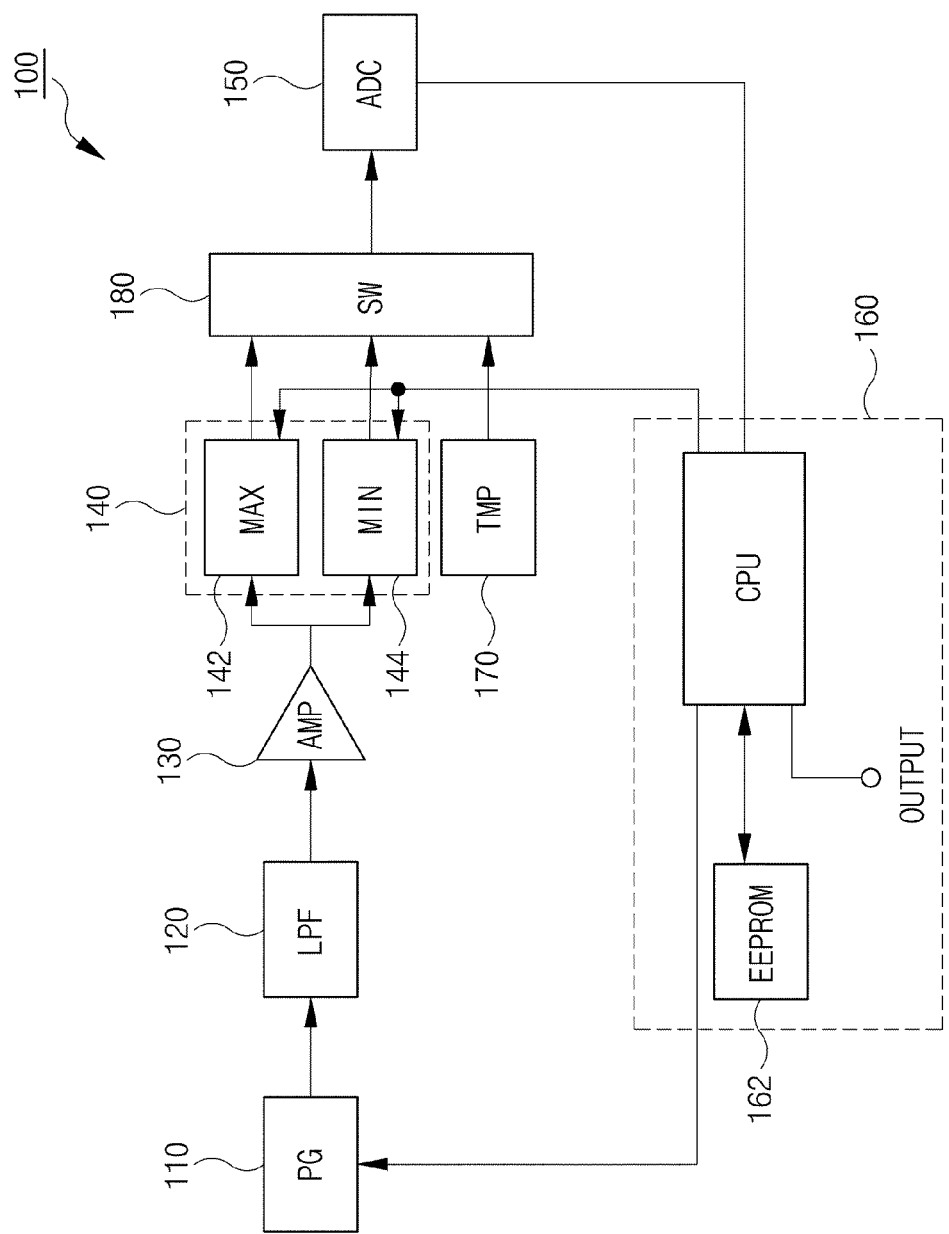
FIG. 6 is a detailed block diagram showing a movement distance measurement apparatus according to a first embodiment of the present invention.
Figure 7:
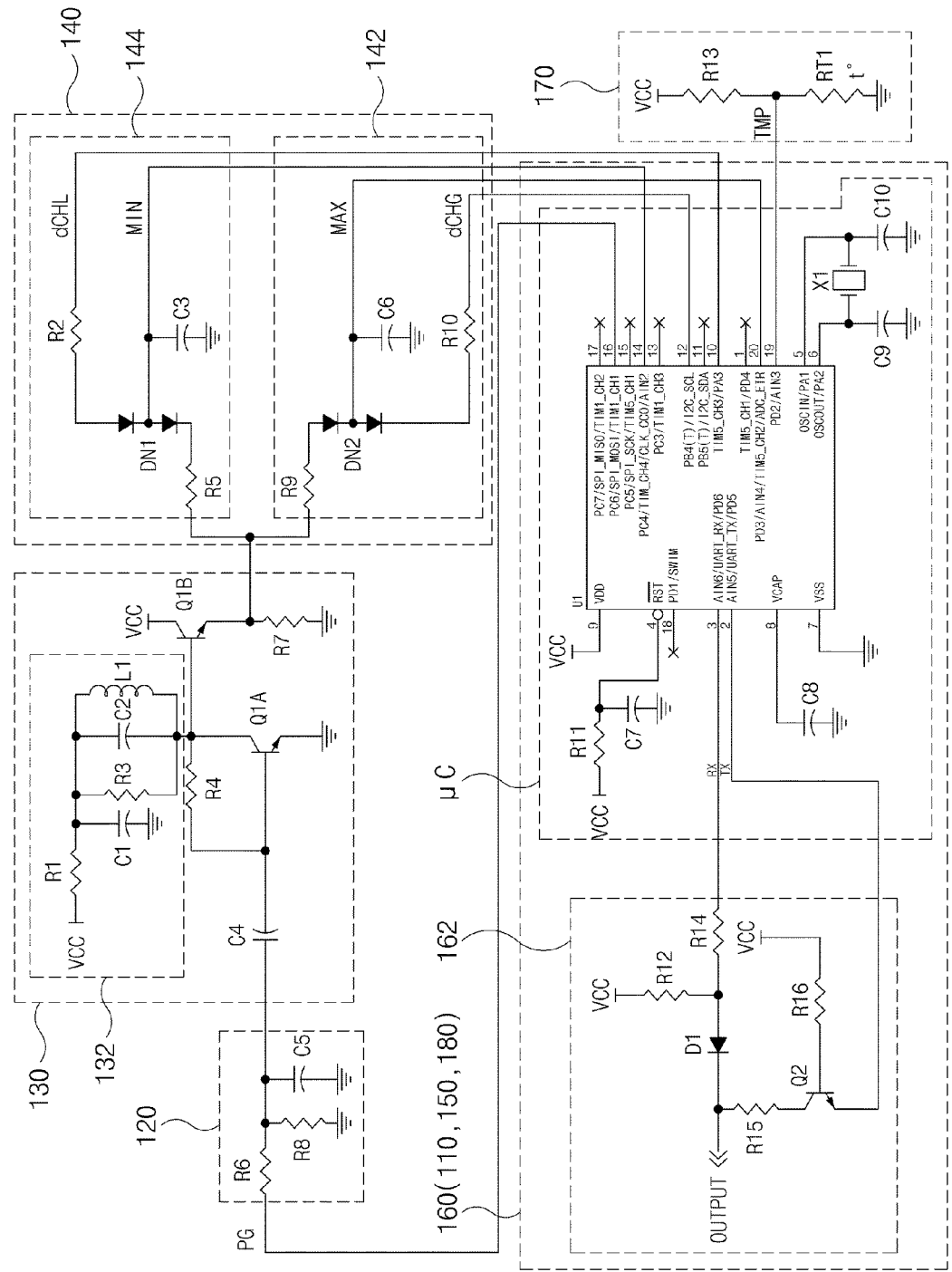
FIG. 7 is a circuit diagram showing an embodiment of the movement distance measurement apparatus of FIG. 6.

FIG. 6 is a detailed block diagram showing a measurement apparatus for confirming the moving distance of FIG. 2 according to a first embodiment of the present invention, and FIG. 7 is a circuit diagram showing an implementation example of the measurement apparatus 100 for confirming the moving distance of FIG. 6. It goes without saying that the implementation shown in FIG. 7 is only an example, and the measurement device 100 may be implemented as other circuits.

As shown in FIGS. 6 and 7, the measurement apparatus 100 for confirming a moving distance according to a first embodiment of the present invention is provided with a square wave generator 110, a low-pass filter 120, a tuned amplifier 130, a detection unit 140, an AD converter 150, and a control unit 160. In addition, the measurement apparatus 100 may further include a temperature sensing unit 170 for temperature correction, and a switching unit 180 for selecting a signal from the signals provided from detection unit 140 and the temperature sensing unit 170. In FIG. 7, the microcontroller μC constituting the control unit 160 is implemented to have built-in functions of the switching unit 180, the AD converter 150, the square wave generator 110, and a memory (EEPROM) 162.

The square wave generator 110 is for generating a square wave of a specific frequency, and may be implemented using a timer embedded in the microcontroller μC constituting the control unit 160 or using a square wave generator well known to those skilled in the art.

The low-pass filter 120 is for converting the square wave generated by the square wave generator 110 into a sine wave or removing noise components (e.g., a second or higher harmonic components or the like) excluding the reference frequency component of the square wave. As shown in FIG. 7, the low-pass filter 120 may be implemented as a low-pass filter well known to those skilled in the art using resistors R6 and R8 and a capacitor C5. In the low-pass filter 120 of FIG. 7, the two resistors R6 and R8 adjust the magnitude of the square wave output from the square wave generator 110, and constitute the low-pass filter together with the capacitor C5, and at this point, the cutoff frequency of the low-pass filter is given as $$f_c = \frac{1}{2\pi C_5 \frac{R_6 \times R_8}{R_6 + R_8}}.$$

The tuned amplifier 130 is configured to amplify a signal passing through the low-pass filter 120, include a resonance circuit 132 including a sensing coil L1, and provide an output signal including a resonance frequency, which changes in response to changes in the distance between the detection target object 20 and the sensing coil L1, and the output voltage of the resonance circuit 132 that changes.

As shown in FIG. 7, the tuned amplifier 130 includes two transistors Q1A and Q2A and a peripheral circuit thereof. The resonance circuit 132 has a parallel structure of a resistor R3, a capacitor C1, and a sensing coil L1, and may be implemented as a resonance circuit as shown in FIG. 3 or an application circuit thereof, or may be implemented as various resonance circuits in addition to the resonance circuit of the circuit structure as shown in FIG. 7. The inductor L1 represents the sensing coil, and the capacitor C2 determines the resonance frequency. The resistor R3 determines selectivity Q of the resonant circuit, together with the internal resistance of the coil. Transistor Q1A performs an amplification function, and transistor Q1B is used as a buffer circuit for the amplifier of transistor Q1A not be affected by the circuit of the detection unit 140.

The detection unit 140 is for detecting the maximum value and the minimum value in the output signal of the tuned amplifier 130, and may be provided with a maximum value detection unit 142 and a minimum value detection unit 144.

The maximum value detection unit 142 detects a maximum value in the output signal of the tuned amplifier 130, and the minimum value detection unit 144 detects a minimum value in the output signal of the tuned amplifier 130, and the detection unit 140 provides the AD converter 150 with the detected value through the switching unit 180.

The maximum value detection unit (MAX) 142 is configured of a diode DN2, resistors R9 and R10, and a capacitor C6, and may be implemented like the circuit shown in FIG. 7. In addition, the maximum value detection unit 142 may be implemented as other circuits well known to those skilled in the art. The maximum value detection unit 142 of FIG. 7 has a configuration in which when the dCHG signal is output at a low level, the capacitor C6 is discharged, and the maximum value detection unit 142 is initialized, and when the dCHG signal becomes a high Vcc level, the maximum signal appearing at the emitter of transistor Q1B constituting the tuned amplifier 130 is charged in the capacitor C6.

The minimum value detection unit (MIN) 144 is configured of a diode DN1, resistors R2 and R5, and a capacitor C3, and may be implemented as the minimum value detection unit 144 like the circuit shown in FIG. 7. In addition, the minimum value detection unit 144 may be implemented as other circuits well known to those skilled in the art. In the minimum value detection unit 144 of FIG. 7, when the dCHL signal is output at a high VCC level, the capacitor C3 is charged to the magnitude of VCC-VD (VD is the voltage of diode DN1), and the minimum value detection unit 144 is initialized, and when the dCHL signal becomes a low level, the capacitor C3 is discharged to the minimum signal appearing at the emitter of transistor Q1B constituting the tuned amplifier 130, and a minimum value appears at the capacitor C3.

The AD converter 150 converts the maximum value (MAX) output signal and the minimum value (MIN) output signal of the detection unit 140 into digital signals and outputs the converted signals. Although the AD converter 150 may be embedded in the microcontroller uc, it may be separately implemented.

The switching unit 180 performs a function of selecting the maximum value (MAX) output signal or the minimum value (MIN) output signal of the detection unit 140 and the temperature detection signal of the temperature sensing unit 170 and providing the selected signal to the AD converter 150. Although the switching unit 180 may be implemented as an analog switch embedded in the microcontroller μC as shown in FIG. 7, it may also be separately implemented.

The temperature sensing unit 170 detects the current temperature and provides a temperature detection signal to the AD converter. The temperature sensing unit 170 includes a resistor R13 and a thermistor RT1 and may be implemented as a circuit structure as shown in FIG. 7, and it may also be implemented as a temperature sensing circuit well known to those skilled in the art. In FIG. 7, the thermistor RT1 is an element of which the resistance value changes according to temperature, and the voltage $V_{TMP}$ output from the temperature sensing unit 170 is given as $$V_{TMP} = \frac{RT_1}{R_{13} + RT_1} \times V_{cc}.$$

The temperature sensing unit 170 may be omitted as needed.

The control unit 160 controls operations of the square wave generator 110, the switching unit 180, the AD converter 150, and the detection unit 140, and may be configured to include the microcontroller μC, the memory (EEPROM) 162, and an output circuit.

The microcontroller μC may include the functions of the square wave generator 110, the switching unit 180, and the AD converter 150, and is embedded with the memory (EEPROM). Accordingly, the microcontroller μC generates the square wave using a built-in timer, reads the minimum and maximum values of the tuned amplifier 130 using the built-in analog switch and the AD converter, and reads the temperature value of the temperature sensing unit 170. Then, the microcontroller μC measures the distance between the sensing coil L1 and the detection target object 20 using these values and data stored in the built-in memory 162.

The memory 162 stores the maximum value and the minimum value, information on the distance between the detection target object 20 and the sensing coil L1 corresponding to a value of difference between the maximum value and the minimum value, and data for temperature correction.

The output circuit (OUTPUT) includes resistors R12, R14, R15, and R16, a diode D1, and a transistor Q2 to be able to perform half-duplex communication and output a PWM signal, and may be implemented as a circuit structure as shown in FIG. 7.

The output circuit performs half-duplex communication using a universal asynchronous receiver/transmitter (UART) embedded in the microcontroller μC when the microcontroller μC is in a correction mode of performing correction n such as temperature correction or the like, and when the microcontroller μC is not in the correction mode, the UART is disabled, and a high signal is output to the RX terminal of the microcontroller μC, and when the PWM signal is output to the TX terminal of the microcontroller μC, the output circuit outputs the PWM signal through transistor Q2 and the resistor R15.

The control unit 160 outputs a moving distance value of the plate 20 by calculating a difference between the maximum value and the minimum value output through the AD converter 150 and comparing the difference with a comparison data stored in the memory 162 in advance.

The control unit 160 periodically applies an initialization signal to the maximum value detection unit 142 and the minimum value detection unit 144 of the detection unit 140 to detect the maximum and minimum values of the output signal of the tuned amplifier 130. In addition, the control unit 160 calculates the difference between the maximum value and the minimum value of the AD converter 150 to obtain and provide the peak value of the output signal, and performs temperature correction when temperature correction is needed. That is, the control unit 160 performs temperature correction using the temperature detection signal with regard to the difference between the maximum value and the minimum value output through the AD converter 150, and then corrects the nonlinear characteristic between the change in the distance between the sensing coil L1 and the plate 20 and the output signal of the tuned amplifier 130 using the data stored in the memory (EEPROM) based on the temperature-corrected difference value, and outputs the result to the output OUTPUT. Accordingly, a moving distance value of the detection target object 20 is output.

In the case of the first embodiment of the present invention described above, there is a problem in that the movement distance measurement apparatus is greatly affected by temperature change. The circuit shown in FIG. 7 generally operates when the temperature around the circuit is within a range of −40 to 150° C., and in this case, the difference in the characteristic appears to be very large according to the temperature.

Particularly, there is a problem in that the tuned amplifier 130 using the bipolar transistor Q1A and the maximum value detection unit (MAX) 142 and the minimum value detection unit (MIN) 144 using the diodes DN1 and DN2 are greatly affected by the temperature.

To solve this problem, a second embodiment of the present invention has been implemented.

The second embodiment of the present invention will be described with reference to FIGS. 8 and 9.

Figure 8:
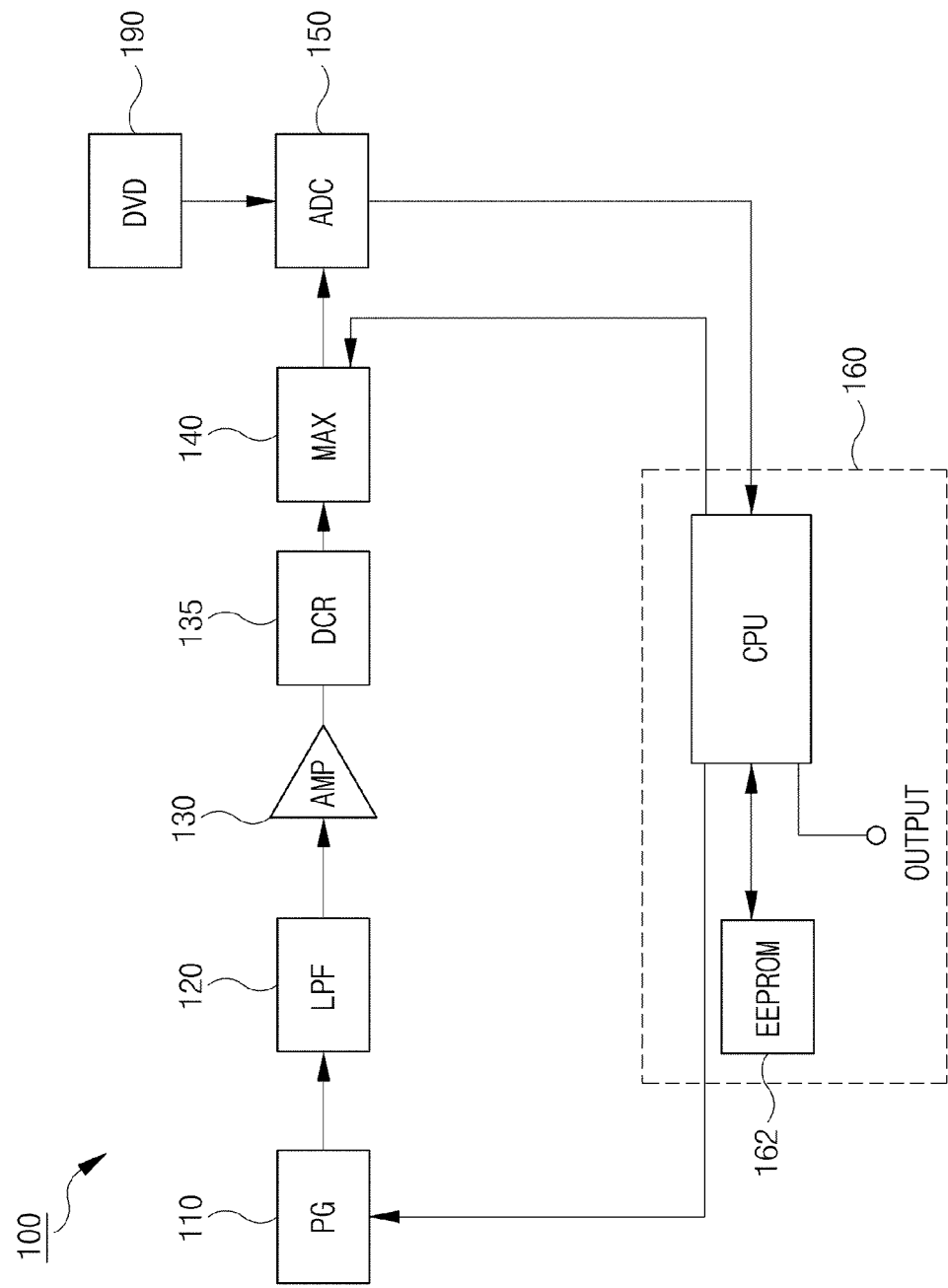
FIG. 8 is a detailed block diagram showing a measurement device for confirming the moving distance of FIG. 2 according to a second embodiment of the present invention.
Figure 9:
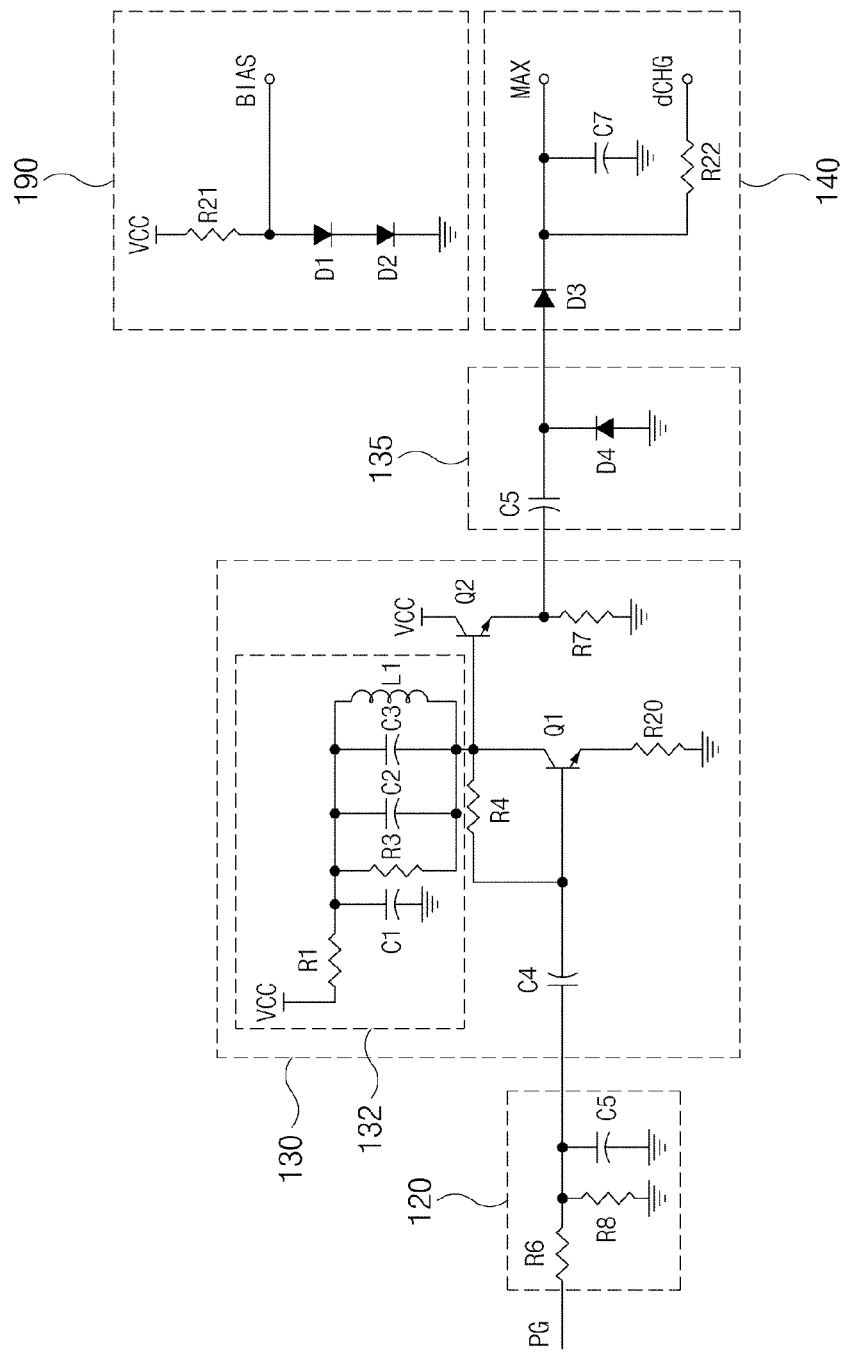
FIG. 9 is a circuit diagram showing an embodiment of a measurement device for confirming the moving distance of FIG. 8.

FIG. 8 is a detailed block diagram showing a measurement device for confirming the moving distance of FIG. 2 according to a second embodiment of the present invention, and FIG. 9 is a circuit diagram showing an embodiment of a measurement device 100 for confirming the moving distance of FIG. 8. It goes without saying that the implementation shown in FIG. 9 is only an example, and the measurement device 100 may be implemented as other circuits.

As shown in FIGS. 8 and 9, the measurement apparatus 100 for confirming a moving distance according to a second embodiment of the present invention is provided with a square wave generator 110, a low-pass filter 120, a tuned amplifier 130, a DC restorer 135, a maximum value detection unit 140, an AD converter 150, and a control unit 160. Unlike the first embodiment of the present invention, the second embodiment of the present invention does not perform temperature correction on the circuit and does not include a minimum value detection unit. However, a temperature sensing unit for correcting the temperature characteristic of the sensing coil due to an eddy current may be required.

In addition, FIG. 9 does not separately show the configurations of the AD converter 150 and the control unit 160. This is since it can be implemented at the level of those skilled in the art by applying or using the first embodiment of the present invention. The second embodiment of the present invention may be implemented such that the microcontroller μC constituting the control unit 160 is embedded with the functions of the AD converter 150, the square wave generator 110, the memory (EEPROM) 162, and the like.

The square wave generator 110 is for generating a square wave of a specific frequency, and may be implemented using a timer embedded in the microcontroller μC constituting the control unit 160 or using a square wave generator well known to those skilled in the art.

The low-pass filter 120 is for converting the square wave generated by the square wave generator 110 into a sine wave or removing noise components (e.g., a second or higher harmonic components or the like) excluding the reference frequency component of the square wave. As shown in FIG. 9, the low-pass filter 120 may be implemented as a low-pass filter well known to those skilled in the art using resistors R6 and R8 and a capacitor C5. In the low-pass filter 120 of FIG. 9, the two resistors R6 and R8 adjust the magnitude of the square wave output from the square wave generator 110, and constitute the low-pass filter together with the capacitor C5, and at this point, the cutoff frequency of the low-pass filter is given as $$f_c = \frac{1}{2\pi C_5 \dfrac{R_6 \times R_8}{R_6 + R_8}}.$$

The tuned amplifier 130 is configured to amplify a signal passing through the low-pass filter 120, include a resonance circuit 132 including a sensing coil L1, and provide an output signal including a resonance frequency, which changes in response to changes in the distance between the detection target object 20 and the sensing coil L1, and the output voltage of the resonance circuit 132 that changes.

As described above, the tuned amplifier shown in FIG. 7, which is the first embodiment of the present invention, has a problem of being affected by temperature. Describing specifically, the voltage gain Av of the tuned amplifier 130 of FIG. 7 is given as $$A_V = -g_m R_L = -\frac{I_C}{V_T} R_L.$$

Here, $$g_m = \frac{I_C}{V_T},$$

$I_c$ denotes collector current of transistor Q1A, $V_T$ denotes thermal voltage, $R_L$ denotes load resistance seen from the collector of transistor Q1A.

In the equation of voltage gain $A_v$, since the thermal voltage $V_T$ changes in proportion to temperature, the voltage gain of the tuned amplifier 130 changes according to the temperature. To improve this problem, the effect of the thermal voltage $V_T$ needs to be lowered by connecting a resistor to the emitter of transistor Q1A.

To this end, the tuned amplifier 130 of the second embodiment of the present invention includes two transistors Q1 and Q2 and a peripheral circuit thereof as shown in FIG. 9. The resonance circuit 132 has a parallel structure of a resistor R3, capacitors C2 and C3, and a sensing coil L1, and may be implemented as a resonance circuit as shown in FIG. 3 or an application circuit thereof, or may be implemented as various resonance circuits in addition to the resonance circuit of the circuit structure as shown in FIG. 9. The inductor L1 represents the sensing coil, and the capacitors C2 and C3 determine the resonance frequency. The resistor R3 determines selectivity Q of the resonant circuit, together with the internal resistance of the coil. Transistor Q1 performs an amplification function, and transistor Q2 is used as a buffer circuit for the amplifier of transistor Q1 not be affected by the circuit of the maximum value detection unit 140.

In the case of FIG. 9, unlike FIG. 7, a resistor R20 is added to the emitter of transistor Q1 performing an amplification function. This is to reduce the effect of the thermal voltage $V_T$ of transistor Q1. Here, the resistor R20 is set to be $$R_{20} \gg \frac{1}{g_m}$$

to minimize the effect of the thermal voltage $V_T$, i.e., the effect of temperature change.

Specifically, the voltage gain $A_v$ of the tuned amplifier of FIG. 9 becomes $$A_V \approx -\frac{R_L}{R_{20} + 1/g_m}.$$

Here, $$g_m = \frac{I_C}{V_T},$$

and $I_c$ denotes collector current of transistor Q1, $V_T$ denotes thermal voltage, and Ry denotes load resistance seen from the collector of transistor Q1.

Since the magnitude of the resistor R20 in the equation of voltage gain $A_v$ of the tuned amplifier of FIG. 9 is $$R_{20} \gg \frac{1}{g_m},$$

the voltage gain $A_v$ of the tuned amplifier of FIG. 9 becomes $$A_V \approx -\frac{R_L}{R_{20}}.$$

Accordingly, as the effect of the thermal voltage is lowered, the voltage gain of the tuned amplifier 130 is less affected by the temperature.

The DC restorer 135 removes the bias voltage from the output signal of the tuned amplifier 130 to output only signals of AC component.

The DC restorer 135 may be configured of a capacitor C5 and a diode D4 connected in series with each other, and may be configured as a clamping circuit for outputting the voltage of the diode D4. Accordingly, when the output signal of the tuned amplifier 130 is input into the DC restorer 135, the bias voltage disappears, and the minimum value of the output signal of the tuned amplifier 130 clamped to the diode D4 is output.

The maximum value detection unit 140 is for detecting the maximum voltage value $V_{MAX}$ from the output signal of the DC restorer 135.

The maximum value detection unit 140 is configured of a diode D3, a resistor R22, and a capacitor C7, and may be implemented as the circuit shown in FIG. 9. That is, the maximum value detection unit 142 may be implemented using a diode D3 connected between the output node of the DC restorer 135 and the output node of the maximum value detection unit 140, a resistor R22 connected between the output node of the maximum value detection unit 140 and the input terminal of the initialization signal dCHG, and a capacitor C7 connected between the output node of the maximum detection unit 140 and the ground. In addition, the maximum value detection unit 142 may be implemented as other circuits well known to those skilled in the art.

The maximum value detection unit 140 of FIG. 9 has a configuration in which when the dCHG signal, i.e., initialization signal, is output at a low level, the capacitor C7 is discharged, and the maximum value detection unit 140 is initialized, and when the dCHG signal becomes a high Vcc level, the maximum voltage value appearing at the emitter of transistor Q2 constituting the tuned amplifier 130 is charged in the capacitor C7.

When it is assumed that the output signal of the tuned amplifier 130 is $V_o(t)$, the output signal of the DC restorer 135 becomes $V_o(t)-V_D$, and the maximum voltage value $V_{MAX}$ output from the maximum value detection unit 140 is given as shown below.

$$V_{MAX}=\max\{V_0(t)-V_D\}-V_D=\text{Peak value of } V_o(t)-2V_D$$

The maximum voltage value $V_{MAX}$ output from the maximum value detection unit 140 is provided to the AD converter 150.

In the maximum voltage value $V_{MAX}$ output from the maximum value detection unit 140, a first diode voltage value $2V_D$ is included by the diode D4 used in the DC restorer 135 and the diode D3 used in the maximum value detection unit 140. Since the first diode voltage value $2V_D$ is sensitive to temperature change, i.e., greatly affected by temperature, it needs to be removed. To this end, a diode voltage detection unit 190 is required.

The diode voltage detection unit 190 detects as many diode voltage values as the number of diodes used in the DC restorer 135 and the maximum value detection unit 140, and provides the diode voltage values to the AD converter 150. The diode voltage value output from the diode voltage detection unit 190 will be referred to as a second diode voltage value.

The diode voltage detection unit 190 is configured using a resistor R21 and at least one diode D1 and D2 sequentially connected in series between the power supply voltage VCC and the ground, and may be implemented as a circuit for outputting the second diode voltage value as an output value as shown in FIG. 9. In addition, the diode voltage detection unit 190 may be implemented as other circuits.

The diode voltage detection unit 190 generates a second diode voltage value $V_{BIAS}$ that is expected to have a value the same as the first diode voltage value $2V_D$ to remove the first diode voltage value $2V_D$, which is greatly affected by temperature, from the maximum voltage value $V_{MAX}$ output from the maximum value detection unit 140, and provides the second diode voltage value $V_{BIAS}$ to the AD converter 150.

The second diode voltage value $V_{BIAS}$, which is the output of the diode voltage detection unit 190, is $V_{BIAS}=2V_D$.

The AD converter 150 converts the maximum voltage value $V_{MAX}$ of the maximum value detection unit 140 and the second diode voltage value $V_{BIAS}$, which is the output of the diode voltage detection unit 190, into digital signals and outputs the converted signals. Although the AD converter 150 may be embedded in the microcontroller uc, it may be separately implemented.

The control unit 160 controls operations of the square wave generator 110, the AD converter 150, and the maximum value detection unit 140, and may be configured to include the microcontroller uc, the memory (EEPROM) 162, and an output circuit.

The microcontroller μC may include the functions of the square wave generator 110, and the AD converter 150, and is embedded with the memory (EEPROM). Accordingly, the microcontroller μC generates the square wave using a built-in timer, and reads the maximum voltage value of the tuned amplifier 130 using the built-in analog switch and the AD converter. Then, the microcontroller μC measures the distance between the sensing coil L1 and the detection target object 20 using these values and data stored in the built-in memory 162.

The memory 162 stores the maximum value and the minimum value, information on the distance between the detection target object 20 and the sensing coil L1 corresponding to a value of difference between the maximum value and the minimum value.

The output circuit OUTPUT is the same as described in the first embodiment of the present invention.

The control unit 160 removes the effect of diode voltage according to temperature change by removing the first diode voltage value $2V_D$ included in the digital-converted maximum voltage value $V_{MAX}$ using the digital-converted second diode voltage value $V_{BIAS}$, and outputs a moving distance value of the detection target object by comparing the maximum voltage value $V_{opp}$, from which the first diode voltage value is removed, with previously stored comparison data.

Specifically, as shown in the following equation, when the digital-converted maximum voltage value $V_{MAX}$ and second diode voltage value $V_{BIAS}$ are added to remove the first diode voltage value, the effect of diode voltage due to temperature change disappears as the first diode voltage value is removed.

$$V_{OPP} = V_{MAX} + V_{BIAS} = \{\text{peak value of } V_o(t) - 2V_D\} + 2V_D = \text{peak value of } v_o(t)$$

Accordingly, it is possible to implement a movement distance measurement apparatus not affected by temperature changes.

The control unit 160 periodically applies an initialization signal to the maximum value detection unit 140 to detect the maximum voltage value of the output signal of the tuned amplifier 130. In addition, the control unit 160 corrects the nonlinear characteristic between the change in the distance between the sensing coil L1 and the plate 20 and the output signal of the tuned amplifier 130 using the data stored in the memory (EEPROM) based on the temperature-corrected difference value, and outputs the result to the output OUTPUT. Accordingly, a moving distance value of the detection target object 20 is output.

As described above, according to the present invention, there is an advantage in that as the changes in the inductance of the sensing coil L1 corresponding to the change in the distance between the sensing target 20 and the sensing coil L1 is measured using the tuning characteristic of the resonance circuit, it is possible to know the operating state of the control device controlled by the operation of the detection target object 20. In addition, it is possible to implement a movement distance measurement apparatus that is not affected by temperature changes.

Since the description of the embodiment described above is merely an example with reference to the drawings for a more thorough understanding of the present invention, it should not be construed as limiting the present invention. In addition, it will be apparent to those skilled in the art that various changes and modifications can be made without departing from the basic principle of the present invention.

DESCRIPTION OF SYMBOLS

20: Detection target object 110: Square wave generator
120: Low-pass filter 130: Tuned amplifier
135: DC restorer 140: Maximum value detection unit
150: AD converter 160: Control unit
190: Diode voltage detection unit

The invention claimed is:

1. A movement distance measurement apparatus for confirming an operating state of a power transmission device for automobiles when a detection target object operates, wherein
in the power transmission device provided with a drive shaft including an engaging structure, a movable propulsion shaft engaged with the drive shaft to transfer power, a detection target object of a metal material connected to the propulsion shaft to move together, an internal operator for transferring an operating force to the propulsion shaft, and an actuator including an actuator driving source to control the power transmission device for automobiles,
the movement distance measurement apparatus comprises:
a square wave generator for generating a square wave of a specific frequency;
a low-pass filter for converting a square wave generated by the square wave generator into a sine wave or removing noise components excluding a reference frequency component of the square wave;
a tuned amplifier configured to amplify a signal passing through the low-pass filter, include a resonance circuit including a sensing coil, and provide an output signal including a resonance frequency, which changes in response to changes in the distance between the detection target object and the sensing coil, and the output voltage of the resonance circuit that changes;
a DC restorer for removing a bias voltage from the output signal of the tuned amplifier to output only signals of AC component;
a maximum value detection unit for detecting a maximum voltage value from the output signal of the DC restorer;
a diode voltage detection unit for detecting as many second diode voltage values as the number of diodes used in the DC restorer and the maximum value detection unit in order to remove a first diode voltage value included in the maximum voltage value output from the maximum value detection unit;
an AD converter for converting the maximum voltage value of the maximum value detection unit and the second diode voltage value of the diode voltage detection unit into digital signals and outputs the converted signals; and
a control unit for removing the effect of diode voltage according to temperature change by removing the first diode voltage value included in the digital-converted maximum voltage value using the digital-converted second diode voltage value, and outputting a moving distance value of the detection target object by comparing the maximum voltage value, from which the first diode voltage value is removed, with previously stored comparison data.

2. The apparatus according to claim 1, wherein the DC restorer is configured of a capacitor and a diode connected in series with each other, and is configured as a clamping circuit for outputting the second diode voltage value.

3. The apparatus according to claim 1, wherein the diode voltage detection unit is configured using a resistor and at least one diode sequentially connected in series between the power supply voltage VCC and the ground, and configured as a circuit for outputting the second diode voltage value as an output value.

4. The apparatus according to claim 1, wherein the control unit removes the effect of the diode voltage according to the temperature change by adding the second diode voltage value to the maximum voltage value digitally converted through the AD converter.

5. The apparatus according to claim 1, wherein when an input signal source having a specific frequency is input into the resonance circuit, the moving distance of the detection target object is measured by using a principle that the output voltage of the tuned amplifier decreases as the distance between the sensing coil and the detection target object increases when the sensing coil and the detection target object are closest to each other, or using the principle that the output voltage of the tuned amplifier decreases as the distance between the sensing coil and the detection target object decreases when the sensing coil and the detection target object are farthest from each other.

6. The apparatus according to claim 3, wherein the control unit removes the effect of the diode voltage according to the temperature change by adding the second diode voltage value to the maximum voltage value digitally converted through the AD converter.

* * * * *